(12) United States Patent
Good et al.

(10) Patent No.: US 7,726,610 B2
(45) Date of Patent: Jun. 1, 2010

(54) SYSTEMS AND METHODS FOR PROVIDING DIFFERENTIAL MOTION TO WING HIGH LIFT DEVICE

(75) Inventors: Mark S. Good, Seattle, WA (US); Paul M. Vijgen, Everett, WA (US); Seth E. Gitnes, Everett, WA (US); Glynn Michael Thomas, Mill Creek, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/352,447

(22) Filed: Jan. 12, 2009

(65) Prior Publication Data

US 2009/0206209 A1   Aug. 20, 2009

Related U.S. Application Data

(63) Continuation of application No. 10/935,846, filed on Sep. 8, 2004, now Pat. No. 7,494,094.

(51) Int. Cl.
*B64C 9/00* (2006.01)
*B64C 13/02* (2006.01)

(52) U.S. Cl. .................... 244/217; 244/218; 244/76 R; 244/99.4

(58) Field of Classification Search ................ 244/201, 244/203, 202, 213–219, 75.1, 76 R, 99.2, 244/99.12, 99.13, 99.3, 99.4, 99.9
See application file for complete search history.

(56) References Cited

U.S. PATENT DOCUMENTS 1,724,456 A   8/1929   Crook
1,770,575 A   7/1930   Ksoll
2,086,085 A   7/1937   Lachmann et al.

(Continued)

FOREIGN PATENT DOCUMENTS

DE    387833    1/1924

(Continued)

OTHER PUBLICATIONS

U.S. Appl. No. 60/475,828, filed Jun. 3, 2003, Beyer.

(Continued)

*Primary Examiner*—Michael R Mansen
*Assistant Examiner*—Joshua J Michener
(74) *Attorney, Agent, or Firm*—Perkins Coie LLP

(57) ABSTRACT

Systems and methods for providing differential motion to wing high lift devices are disclosed. A system in accordance with one embodiment of the invention includes a wing having a leading edge, a trailing edge, a first deployable lift device with a first spanwise location, and a second deployable lift device with a second spanwise location different than the first. The wing system can further include a drive system having a drive link operatively coupleable to both the first and second deployable lift devices, and a control system operatively coupled to the drive system. The control system can have a first configuration for which the drive link is operatively coupled to the first and second deployable lift devices, and activation of at least a portion of the drive link moves the first and second deployable lift devices together. In a second configuration, the drive link is operatively coupled to at least the first deployable lift device and operatively decoupled from the second deployable lift device, so that actuation of at least a portion of the drive link moves the first deployable lift device relative to the second deployable lift device.

15 Claims, 13 Drawing Sheets

U.S. PATENT DOCUMENTS

| | | |
|---|---|---|
| 2,169,416 A | 8/1939 | Griswold |
| 2,282,516 A | 5/1942 | Hans et al. |
| 2,289,704 A | 7/1942 | Grant |
| 2,319,383 A | 5/1943 | Zap |
| 2,444,293 A | 6/1943 | Holt |
| 2,347,230 A | 4/1944 | Zuck |
| 2,358,985 A | 9/1944 | McAndrew |
| 2,378,528 A | 6/1945 | Arsandaux |
| 2,383,102 A | 8/1945 | Zap |
| 2,385,351 A | 9/1945 | Davidsen |
| 2,387,492 A | 10/1945 | Blaylock et al. |
| 2,389,274 A | 11/1945 | Pearsall et al. |
| 2,406,475 A | 8/1946 | Rogers |
| 2,422,296 A | 6/1947 | Flader et al. |
| 2,458,900 A | 1/1949 | Erny |
| 2,504,684 A | 4/1950 | Harper |
| 2,518,854 A | 8/1950 | Badenoch |
| 2,555,862 A | 6/1951 | Romani |
| 2,563,453 A | 8/1951 | Briend |
| 2,652,812 A | 9/1953 | Fenzl |
| 2,665,084 A | 1/1954 | Feeney et al. |
| 2,851,229 A | 9/1958 | Clark |
| 2,864,239 A | 12/1958 | Taylor |
| 2,877,968 A | 3/1959 | Granan et al. |
| 2,886,008 A | 5/1959 | Geyer et al. |
| 2,891,740 A | 6/1959 | Campbell |
| 2,892,312 A | 6/1959 | Allen et al. |
| 2,899,152 A | 8/1959 | Weiland |
| 2,912,190 A | 11/1959 | MacDonough |
| 2,920,844 A | 1/1960 | Marshall et al. |
| 2,938,680 A | 5/1960 | Greene et al. |
| 2,990,144 A | 6/1961 | Hougland |
| 2,990,145 A | 6/1961 | Hougland |
| 3,013,748 A | 12/1961 | Westburg |
| 3,089,666 A | 5/1963 | Quenzler |
| 3,102,607 A | 9/1963 | Roberts |
| 3,112,089 A | 11/1963 | Dornier |
| 3,136,504 A | 6/1964 | Carr |
| 3,166,271 A | 1/1965 | Zuck |
| 3,203,275 A | 8/1965 | Hoover |
| 3,263,946 A | 8/1966 | Roberts et al. |
| 3,282,535 A | 11/1966 | Steiner |
| 3,375,998 A | 4/1968 | Alvarez-Calderon |
| 3,423,858 A | 1/1969 | Speno |
| 3,447,763 A | 6/1969 | Allcock |
| 3,463,418 A | 8/1969 | Miksch |
| 3,504,870 A | 4/1970 | Cole et al. |
| 3,528,632 A | 9/1970 | Miles et al. |
| 3,539,133 A | 11/1970 | Robertson |
| 3,556,439 A | 1/1971 | Autry et al. |
| 3,587,311 A | 6/1971 | Hays, Jr. |
| 3,589,648 A | 6/1971 | Gorham et al. |
| 3,642,234 A | 2/1972 | Kamber et al. |
| 3,653,611 A | 4/1972 | Trupp et al. |
| 3,659,810 A | 5/1972 | Robertson |
| 3,677,504 A | 7/1972 | Schwarzler et al. |
| 3,704,743 A | 12/1972 | Edwards et al. |
| 3,704,828 A | 12/1972 | Studer et al. |
| 3,711,039 A | 1/1973 | James |
| 3,743,219 A | 7/1973 | Gorges et al. |
| 3,767,140 A | 10/1973 | Johnson |
| 3,794,276 A | 2/1974 | Maltby et al. |
| 3,804,267 A | 4/1974 | Cook et al. |
| 3,807,447 A | 4/1974 | Masuda et al. |
| 3,813,062 A | 5/1974 | Prather |
| 3,827,658 A | 8/1974 | Hallworth |
| 3,831,886 A | 8/1974 | Burdges et al. |
| 3,836,099 A | 9/1974 | O'Neill et al. |
| 3,837,601 A | 9/1974 | Cole |
| 3,862,730 A | 1/1975 | Heiney |
| 3,874,617 A | 4/1975 | Johnson |
| 3,897,029 A | 7/1975 | Calderon et al. |
| 3,904,152 A | 9/1975 | Hill |
| 3,910,530 A | 10/1975 | James et al. |
| 3,913,450 A | 10/1975 | MacGregor |
| 3,917,192 A | 11/1975 | Alvarez-Calderon et al. |
| 3,931,374 A | 1/1976 | Moutet et al. |
| 3,941,334 A | 3/1976 | Cole |
| 3,941,341 A | 3/1976 | Brogdon, Jr. |
| 3,949,957 A | 4/1976 | Portier et al. |
| 3,968,946 A | 7/1976 | Cole |
| 3,985,319 A | 10/1976 | Dean et al. |
| 3,991,574 A | 11/1976 | Frazier |
| 3,992,979 A | 11/1976 | Smith et al. |
| 3,993,584 A | 11/1976 | Owen et al. |
| 3,994,451 A | 11/1976 | Cole |
| 4,011,888 A | 3/1977 | Whelchel et al. |
| 4,015,787 A | 4/1977 | Maieli et al. |
| 4,106,730 A | 8/1978 | Spitzer et al. |
| 4,117,996 A | 10/1978 | Sherman |
| 4,120,470 A | 10/1978 | Whitener |
| 4,131,253 A | 12/1978 | Zapel |
| 4,146,200 A | 3/1979 | Borzachillo |
| 4,171,787 A | 10/1979 | Zapel |
| 4,180,222 A | 12/1979 | Thornburg |
| 4,181,275 A | 1/1980 | Moelter et al. |
| 4,189,120 A | 2/1980 | Wang |
| 4,189,121 A | 2/1980 | Harper et al. |
| 4,189,122 A | 2/1980 | Miller |
| 4,200,253 A | 4/1980 | Rowarth et al. |
| 4,202,519 A | 5/1980 | Fletcher |
| 4,240,255 A | 12/1980 | Benilan et al. |
| 4,262,868 A | 4/1981 | Dean |
| 4,267,990 A | 5/1981 | Staudacher et al. |
| 4,275,942 A | 6/1981 | Steidl |
| 4,283,029 A | 8/1981 | Rudolph |
| 4,285,482 A | 8/1981 | Lewis |
| 4,293,110 A | 10/1981 | Middleton et al. |
| 4,312,486 A | 1/1982 | McKinney |
| 4,325,123 A | 4/1982 | Graham et al. |
| 4,351,502 A | 9/1982 | Statkus |
| 4,353,517 A | 10/1982 | Rudolph |
| 4,358,077 A | 11/1982 | Coronel |
| 4,360,176 A | 11/1982 | Brown |
| 4,363,098 A | 12/1982 | Buus et al. |
| 4,365,774 A | 12/1982 | Coronel |
| 4,368,937 A | 1/1983 | Palombo et al. |
| 4,384,693 A | 5/1983 | Pauly et al. |
| 4,427,168 A | 1/1984 | McKinney et al. |
| 4,441,675 A | 4/1984 | Boehringer et al. |
| 4,444,368 A | 4/1984 | Andrews |
| 4,459,084 A | 7/1984 | Clark |
| 4,461,449 A | 7/1984 | Turner |
| 4,471,925 A | 9/1984 | Kunz et al. |
| 4,471,927 A | 9/1984 | Rudolph et al. |
| 4,472,780 A | 9/1984 | Chenoweth et al. |
| 4,475,702 A | 10/1984 | Cole |
| 4,479,620 A | 10/1984 | Rogers et al. |
| 4,485,992 A | 12/1984 | Rao |
| 4,496,121 A | 1/1985 | Berlin |
| 4,498,646 A | 2/1985 | Proksch et al. |
| 4,528,775 A | 7/1985 | Einarsson et al. |
| 4,533,096 A | 8/1985 | Baker et al. |
| 4,542,869 A | 9/1985 | Brine |
| 4,544,117 A | 10/1985 | Schuster |
| 4,553,722 A | 11/1985 | Cole |
| 4,575,099 A | 3/1986 | Nash |
| 4,576,347 A | 3/1986 | Opsahl |
| 4,637,573 A | 1/1987 | Perin et al. |
| 4,650,140 A | 3/1987 | Cole |
| 4,691,879 A | 9/1987 | Greene |
| 4,700,911 A | 10/1987 | Zimmer et al. |
| 4,702,441 A | 10/1987 | Wang |
| 4,706,913 A | 11/1987 | Cole |

| | | | | | |
|---|---|---|---|---|---|
| 4,712,752 A | 12/1987 | Victor | 6,076,776 A | 6/2000 | Breitbach et al. |
| 4,717,097 A | 1/1988 | Sepstrup | 6,079,672 A | 6/2000 | Lam et al. |
| 4,720,066 A | 1/1988 | Renken et al. | 6,082,679 A | 7/2000 | Crouch et al. |
| 4,729,528 A | 3/1988 | Borzachillo | 6,085,129 A | 7/2000 | Schardt et al. |
| 4,747,375 A | 5/1988 | Williams | 6,109,567 A | 8/2000 | Munoz Saiz et al. |
| 4,779,822 A | 10/1988 | Burandt et al. | 6,145,791 A | 11/2000 | Diller et al. |
| 4,784,355 A | 11/1988 | Brine | 6,152,405 A | 11/2000 | Muller et al. |
| 4,786,013 A | 11/1988 | Pohl et al. | 6,161,801 A | 12/2000 | Kelm et al. |
| 4,789,119 A | 12/1988 | Bellego et al. | 6,164,598 A | 12/2000 | Young et al. |
| 4,796,192 A | 1/1989 | Lewis | 6,173,924 B1 | 1/2001 | Young et al. |
| 4,823,836 A | 4/1989 | Bachmann et al. | 6,189,837 B1 | 2/2001 | Matthews |
| 4,834,319 A | 5/1989 | Ewy et al. | 6,213,433 B1 | 4/2001 | Gruensfelder et al. |
| 4,838,503 A | 6/1989 | Williams et al. | 6,227,498 B1 | 5/2001 | Arata |
| 4,854,528 A | 8/1989 | Hofrichter et al. | 6,244,542 B1 | 6/2001 | Young et al. |
| 4,856,735 A | 8/1989 | Lotz et al. | 6,293,497 B1 | 9/2001 | Kelley-Wickemeyer et al. |
| 4,867,394 A | 9/1989 | Patterson, Jr. | 6,328,265 B1 | 12/2001 | Dizdarevic |
| 4,892,274 A | 1/1990 | Pohl et al. | 6,349,798 B1 | 2/2002 | McKay et al. |
| 4,899,284 A | 2/1990 | Lewis et al. | 6,349,903 B2 | 2/2002 | Caton et al. |
| 4,962,902 A | 10/1990 | Fortes | 6,364,254 B1 | 4/2002 | May et al. |
| 4,991,800 A * | 2/1991 | Schwarz ............... 244/226 | 6,375,126 B1 | 4/2002 | Sakurai et al. |
| 5,039,032 A | 8/1991 | Rudolph | 6,382,566 B1 | 5/2002 | Ferrel et al. |
| 5,046,688 A | 9/1991 | Woods | 6,431,498 B1 | 8/2002 | Watts et al. |
| 5,050,081 A | 9/1991 | Abbott et al. | 6,439,512 B1 | 8/2002 | Hart |
| 5,056,741 A | 10/1991 | Bliesner et al. | 6,443,394 B1 | 9/2002 | Weisend, Jr. |
| 5,074,495 A | 12/1991 | Raymond | 6,450,457 B1 | 9/2002 | Sharp et al. |
| 5,082,207 A | 1/1992 | Tulinius | 6,464,175 B2 | 10/2002 | Yada et al. |
| 5,082,208 A | 1/1992 | Matich | 6,466,141 B1 | 10/2002 | McKay et al. |
| 5,088,665 A | 2/1992 | Vijgen et al. | 6,466,234 B1 | 10/2002 | Pyle et al. |
| 5,094,411 A | 3/1992 | Rao | 6,478,541 B1 | 11/2002 | Charles et al. |
| 5,094,412 A | 3/1992 | Narramore | 6,481,667 B1 | 11/2002 | Ho |
| 5,100,082 A | 3/1992 | Archung | 6,484,969 B2 | 11/2002 | Sprenger et al. |
| 5,114,100 A | 5/1992 | Rudolph et al. | 6,499,577 B2 | 12/2002 | Kitamoto et al. |
| 5,129,597 A | 7/1992 | Manthey et al. | 6,536,714 B2 | 3/2003 | Gleine et al. |
| 5,158,252 A | 10/1992 | Sakurai | 6,547,183 B2 | 4/2003 | Farnsworth |
| 5,167,383 A | 12/1992 | Nozaki et al. | 6,554,229 B1 | 4/2003 | Lam et al. |
| 5,203,619 A | 4/1993 | Welsch et al. | 6,561,463 B1 | 5/2003 | Yount et al. |
| 5,207,400 A | 5/1993 | Jennings et al. | 6,568,189 B2 | 5/2003 | Blot-Carretero et al. |
| 5,244,269 A | 9/1993 | Harriehausen et al. | 6,591,169 B2 | 7/2003 | Jones et al. |
| 5,259,293 A | 11/1993 | Brunner et al. | 6,598,829 B2 | 7/2003 | Kamstra |
| 5,280,863 A | 1/1994 | Schmittle | 6,598,834 B2 | 7/2003 | Nettle et al. |
| 5,282,591 A | 2/1994 | Walters et al. | 6,601,801 B1 | 8/2003 | Prow et al. |
| 5,310,387 A | 5/1994 | Savagian | 6,622,972 B2 | 9/2003 | Urnes, Sr. et al. |
| 5,351,914 A | 10/1994 | Nagao et al. | 6,622,974 B1 | 9/2003 | Dockter et al. |
| 5,388,788 A | 2/1995 | Rudolph | 6,625,982 B2 | 9/2003 | Van Den Bossche et al. |
| 5,420,582 A | 5/1995 | Kubbat et al. | 6,644,599 B2 | 11/2003 | Perez |
| 5,441,218 A | 8/1995 | Mueller et al. | 6,651,930 B1 | 11/2003 | Gautier et al. |
| 5,474,265 A | 12/1995 | Capbern et al. | 6,698,523 B2 | 3/2004 | Barber |
| 5,493,497 A | 2/1996 | Buus | 6,729,583 B2 | 5/2004 | Milliere et al. |
| 5,535,852 A | 7/1996 | Bishop et al. | 6,745,113 B2 | 6/2004 | Griffin et al. |
| 5,542,684 A | 8/1996 | Squirrell et al. | 6,755,375 B2 | 6/2004 | Trikha |
| 5,544,847 A | 8/1996 | Bliesner | 6,796,526 B2 | 9/2004 | Boehringer |
| 5,600,220 A | 2/1997 | Thoraval et al. | 6,796,534 B2 | 9/2004 | Beyer et al. |
| 5,609,020 A | 3/1997 | Jackson et al. | 6,799,739 B1 | 10/2004 | Jones |
| 5,680,124 A | 10/1997 | Bedell et al. | 6,802,475 B2 | 10/2004 | Davies et al. |
| 5,681,014 A | 10/1997 | Palmer | 6,824,099 B1 | 11/2004 | Jones |
| 5,686,907 A | 11/1997 | Bedell et al. | 6,843,452 B1 | 1/2005 | Vassberg et al. |
| 5,735,485 A | 4/1998 | Ciprian et al. | 6,860,452 B2 | 3/2005 | Bacon et al. |
| 5,740,991 A | 4/1998 | Gleine et al. | 6,870,490 B2 | 3/2005 | Sherry et al. |
| 5,743,490 A | 4/1998 | Gillingham et al. | 6,915,190 B2 | 7/2005 | Galasso |
| 5,746,490 A | 5/1998 | Domenig | 6,978,971 B1 | 12/2005 | Dun |
| 5,788,190 A | 8/1998 | Siers | 6,980,198 B1 | 12/2005 | Gyde et al. |
| 5,839,698 A | 11/1998 | Moppert | 6,981,676 B2 | 1/2006 | Milliere et al. |
| 5,875,998 A | 3/1999 | Gleine et al. | 7,007,889 B2 | 3/2006 | Charron |
| 5,915,653 A | 6/1999 | Koppelman | 7,007,897 B2 | 3/2006 | Wingett et al. |
| 5,927,656 A | 7/1999 | Hinkleman | 7,028,948 B2 | 4/2006 | Pitt |
| 5,934,615 A | 8/1999 | Treichler et al. | 7,048,228 B2 | 5/2006 | Vassberg et al. |
| 5,978,715 A | 11/1999 | Briffe et al. | 7,048,234 B2 | 5/2006 | Recksiek et al. |
| 5,984,230 A | 11/1999 | Orazi | 7,048,235 B2 | 5/2006 | McLean et al. |
| 6,015,117 A | 1/2000 | Broadbent et al. | 7,051,975 B2 | 5/2006 | Pohl et al. |
| 6,033,180 A | 3/2000 | Machida et al. | 7,051,982 B1 | 5/2006 | Johnson |
| 6,045,204 A | 4/2000 | Frazier et al. | 7,059,563 B2 | 6/2006 | Huynh |
| 6,073,624 A | 6/2000 | Laurent | 7,147,241 B2 | 12/2006 | Beaujot et al. |
| 6,076,767 A | 6/2000 | Farley et al. | 7,226,020 B2 | 6/2007 | Pohl et al. |

| | | |
|---|---|---|
| 7,243,881 B2 | 7/2007 | Sakurai et al. |
| 7,258,308 B2 | 8/2007 | Beyer |
| 7,264,206 B2 | 9/2007 | Wheaton et al. |
| 7,270,305 B2 | 9/2007 | Rampton et al. |
| 7,322,547 B2 | 1/2008 | Konings |
| 7,338,018 B2 | 3/2008 | Huynh et al. |
| 7,357,358 B2 | 4/2008 | Lacy et al. |
| 7,363,119 B2 | 4/2008 | Griffin, III et al. |
| 7,424,350 B2 | 9/2008 | Speer |
| 7,455,264 B2 | 11/2008 | Wakayama |
| 7,506,842 B2 | 3/2009 | Jones |
| 2004/0059474 A1 | 3/2004 | Boorman et al. |
| 2005/0109826 A1 | 5/2005 | Fry et al. |
| 2005/0242234 A1 | 11/2005 | Mahmulyin |
| 2006/0038086 A1 * | 2/2006 | Reckzeh |
| 2006/0144996 A1 * | 7/2006 | Carl et al. .................. 244/99.2 |
| 2006/0169874 A1 | 8/2006 | Lien et al. |
| 2007/0176051 A1 | 8/2007 | Good et al. |
| 2007/0252040 A1 | 11/2007 | Kordel et al. |
| 2008/0283672 A1 * | 11/2008 | Denzler et al. .............. 244/213 |

FOREIGN PATENT DOCUMENTS

| | | |
|---|---|---|
| DE | 1129379 | 5/1962 |
| EP | 0100775 | 2/1984 |
| EP | 0103038 | 3/1984 |
| EP | 0370640 | 5/1990 |
| EP | 0483504 | 5/1992 |
| EP | 0489521 | 6/1992 |
| EP | 0781704 | 7/1997 |
| EP | 0947421 | 10/1999 |
| EP | 1010616 | 6/2000 |
| EP | 1338506 | 8/2003 |
| EP | 1547917 | 6/2005 |
| FR | 705155 | 6/1931 |
| FR | 984443 | 7/1951 |
| FR | 56121 | 9/1952 |
| FR | 57988 | 9/1953 |
| FR | 58273 | 11/1953 |
| GB | 886136 | 1/1962 |
| GB | 1181991 | 2/1970 |
| GB | 2144688 | 3/1985 |
| WO | WO-0224530 | 3/2002 |

OTHER PUBLICATIONS

U.S. Appl. No. 10/671,435, filed Sep. 24, 2003, Robert Kelley-Wickemeyer.
"777 Maintenance Manual—777 High Lift System," Published circa 1994, p. 1.
"777 Maintenance Manual—777 Transmission—Typical," Published circa 1994, p. 1.
"777 Maintenance Manual—Flap Drive System," Published circa 1994, p. 1.
"777 Maintenance Manual—Flap Transmission and Support," Published circa 1994, p. 1.
"A320 Hinterkantem-Klappen-VerstellSystem, Trailing Edge Flap System," SAE Presentation, Published circa 1990, p. 1.
"A340 Flight Controls—Flap Controls," SAE Presentation, Published circa 1995, p. 1.
"Aero-Space Research & Technology," Space Systems, Sep. 1, 2001, pp. 1-28.
"Component Maintenance Manual for B43540," Moog, Inc., May 1994 pp. 1-2.
"Flap (aircraft)", Wikipedia, The Free Encyclopedia, Jul. 20, 2006, 14:15 revision, <http://en.wikipedia.org/w/index.php?title=Flap_%28aircraft%29&oldid=67413665>, pp. 1-2, accessed Aug. 5, 2006.
"Leaf Spring Retainer Seals," EMP, Inc., <http://www.epm.com/leaf_spring.htm>, pp. 1-2, accessed Apr. 27, 2005.
"Morphing Aircraft Structures—Raytheon," Defense Update, <http://www.defense-update.com/products/m/morphing-structures.htm>, pp. 1-3, accessed Aug. 31, 2005.
"Morphing Aircraft Structures,"-Penn State University, www.personal.psu.edu/users/d/s/dsr134/mas/Cellular.htm, pp. 1-3.
"Slats" Wikipedia, The Free Encyclopedia, Jun. 27, 2006, 12:23:00 revision, <http://wn.wikipedia.org/w/index.php?title=Slats&oldid=60827639> [accessed Aug. 5, 2006], pp. 1-2.
"TU-144 Canord," p. 1.
"Adaptive Aircraft: No Flight of Fancy?" Research into using exotic means of making wings change shpe in-flight looks promising, though still a long way from reality, Business Week Online, 3 pages, accessed on Jan. 7, 2003.
"Morphing Aerostructure—an Overview," www.crgrp.net, pp. 1-9.
"Supercritical" The High Speed Frontier, Chapter 2: The High-Speed Airfoil Program, http://www.hg.nasa.gov/office/pao/History/SP-445/ch2-5, 4 pages, 1957-1978.
Boeing, 777 Aircraft Maintenance Manual, 39 pages, Sep. 5, 2002.
Drela, Mark, "Design and Optimization Method for Mutli-Element Airfoils," MIT Department of Aeronautics and Astronautics, Copyright 1993 American Institute of Aeronautics and Astronautics, Inc., pp. 1-11.
Drela, Mark, "Optimization Techniques in Airfoil Design," MIT Department of Aeronautics and Astronautics, pp. 1-30.
European Search Report for European Patent Application No. EP 03 07 7840, The Boeing Company, Nov. 4, 2003, pp. 1-2.
Hansen. H., "Application of Mini-Trailing-Edge Devices in the Awiator Project," Airbus Deutschland, EGAG, 19 pgs; Jan. 7, 2003.
International Search Report for PCT/US2005/031659, The Boeing Company; Dec. 23, 2005, pp. 1-5.
Junkers JU 52/3M, http://www.wpafb.af.mil/museum/outdoor/od16, 2 pages, accessed Aug. 7, 2003.
Moog, Component Maintenance Manual, May 1994 (2 pages).
Niu, Michael C.Y., "Airframe Structural Design," Hong Kong Conmilit Press, 1988, p. 312.
Petrov, A. V., "Certain Types of Separated Flow over Slotted Wings," Fluid Mechanics-Soviet Research, Sep.-Oct. 1978, vol. 7, No. 5, pp. 80-89.
Rea, Jon, "Boeing 777 High Lift Control System," Boeing Commercial Airplane Group, IEEE AES Systems Magazine, Aug. 1993, pp. 15-21.
Whitcomb, Richard T., "Review of NASA Supercritical Airfoils," National Aeronautics and Space Administration, Aug. 1974 (pp. 8-18).
Written Opinion for PCT/US2005/031659, The Boeing Company, Dec. 23, 2005, pp. 1-6.

* cited by examiner

SYSTEMS AND METHODS FOR PROVIDING DIFFERENTIAL MOTION TO WING HIGH LIFT DEVICE

CROSS-REFERENCE TO RELATED APPLICATION

This is a continuation application of U.S. patent application Ser. No. 10/935,846, filed Sep. 8, 2004, entitled SYSTEMS AND METHODS FOR PROVIDING DIFFERENTIAL MOTION TO WING HIGH LIFT DEVICE, which is herein incorporated by reference in its entirety.

TECHNICAL FIELD

The present invention is directed generally toward systems and methods for providing differential motion to wing high lift devices, for example, to provide differential camber to wings during high speed flight.

BACKGROUND

Modern commercial transport aircraft have wings that are designed to be very efficient at high subsonic Mach numbers. Accordingly, the wings can provide relatively high fuel efficiency during cruise flight segments, which make up the bulk of a typical airliner flight plan, particularly for long range aircraft. These aircraft typically include other devices (e.g., leading edge devices, trailing edge devices, and spoilers) that change the shape of the aircraft wing during takeoff, descent, and/or landing. Accordingly, the shape of the wing can be temporarily changed to increase the lift and/or drag of the wing during non-cruise flight segments.

Continued competitive pressure on airlines and manufacturers has made fuel efficiency an increasingly important aspect of aircraft operations. Increasing fuel prices have exacerbated this pressure. However, existing systems may not improve aircraft fuel efficiency to desired levels, while still maintaining low costs for system development, manufacturing, operations, and maintenance, and while maintaining commonality with existing systems.

SUMMARY

The present invention is directed generally to systems and methods for providing differential motion to wing high lift devices. The differential motion can be used to tailor the spanwise camber distribution of the wing, thereby improving the aerodynamic efficiency of the wing, for example, at high aircraft speeds. An aircraft wing system in accordance with one aspect of the invention includes a wing having a leading edge and a trailing edge, a first deployable lift device having a first spanwise location and a second deployable lift device having a second spanwise location different than the first. Each lift device can be movable relative to the wing from a stowed position to a deployed position. The wing system can further include a drive system having a drive link operatively coupleable to both the first and second lift devices. A control system is operatively coupled to the drive system and has a first configuration for which the drive link is operatively coupled to the first and second lift devices, and activation of at least a portion of the drive link moves the first and second lift devices together. The control system also has a second configuration for which the drive link is operatively coupled to the first lift device and operatively decoupled from the second lift device, and activation of at least a portion of the drive link moves the first lift device relative to the second lift device.

In further embodiments, the control system can have a third configuration for which the drive link is operatively coupled to the second lift device and operatively decoupled from the first lift device. Accordingly, activation of at least a portion of the drive link moves the second lift device relative to the first lift device. In still further embodiments, the drive link can include a mechanical drive shaft or a hydraulic link, and the first lift device can be located inboard or outboard of the second lift device.

A method for operating an aircraft wing system in accordance with another aspect of the invention includes coupling first and second deployable lift devices of a wing with a drive link, wherein the first and second deployable lift devices are located at different spanwise locations of the wing. The method can further include moving the first and second deployable lift devices together by activating the drive link, decoupling the second deployable lift device from the drive link, and moving the first deployable lift device relative to the second deployable lift device by activating the drive link while the second deployable lift device is decoupled from the drive link.

In further embodiments, the method can further comprise limiting a range of motion of the first lift device to have a first value when moving the first and second lift devices together, and limiting the range of motion of the first lift device to have a second value less than the first value when moving the first lift device relative to the second lift device. Moving the first lift device relative to the second can include changing a spanwise camber distribution of the wing.

DETAILED DESCRIPTION

The following disclosure describes systems and methods for providing differential motion to wing high lift devices. Certain specific details are set forth in the following description and in FIGS. 1-5 to provide a thorough understanding of various embodiments of the invention. Well-known structures, systems, and methods often associated with wing high lift devices have not been shown or described in detail below to avoid unnecessarily obscuring the description of the various embodiments of the invention. In addition, those of ordinary skill in the relevant art will understand that additional embodiments of the present invention may be practiced without several of the details described below.

Many embodiments of the invention described below may take the form of computer-executable instructions, such as routines executed by a programmable computer. Those skilled in the relevant art will appreciate that the invention can be practiced on other computer system configurations as well. The invention can be embodied in a special-purpose computer or data processor that is specifically programmed, configured or constructed to perform one or more of the computer-executable instructions described below. Accordingly, the term "computer" as generally used herein includes any processor and can include Internet appliances, hand-held devices (including palm-top computers, cellular or mobile phones, multiprocessor systems, processor-based or programmable consumer electronics, minicomputers and the like).

The invention can also be practiced in distributed computing environments, where tasks or modules are performed by remote processing devices that are linked with a communications network. In a distributed computing environment, program modules or subroutines may be located in both local and remote memory storage devices. Aspects of the invention described below may be stored or distributed on computer-readable media, including magnetic or optically readable computer disks (e.g., removable disks) as well as distributed electronically over networks. Data structures and transmissions of data particular to aspects of the invention are also encompassed within the scope of the invention. Information handled in accordance with aspects of the invention can be presented at displays or display media, for example, CRT screens, LCD screens, or other suitable devices.

Figure 1:
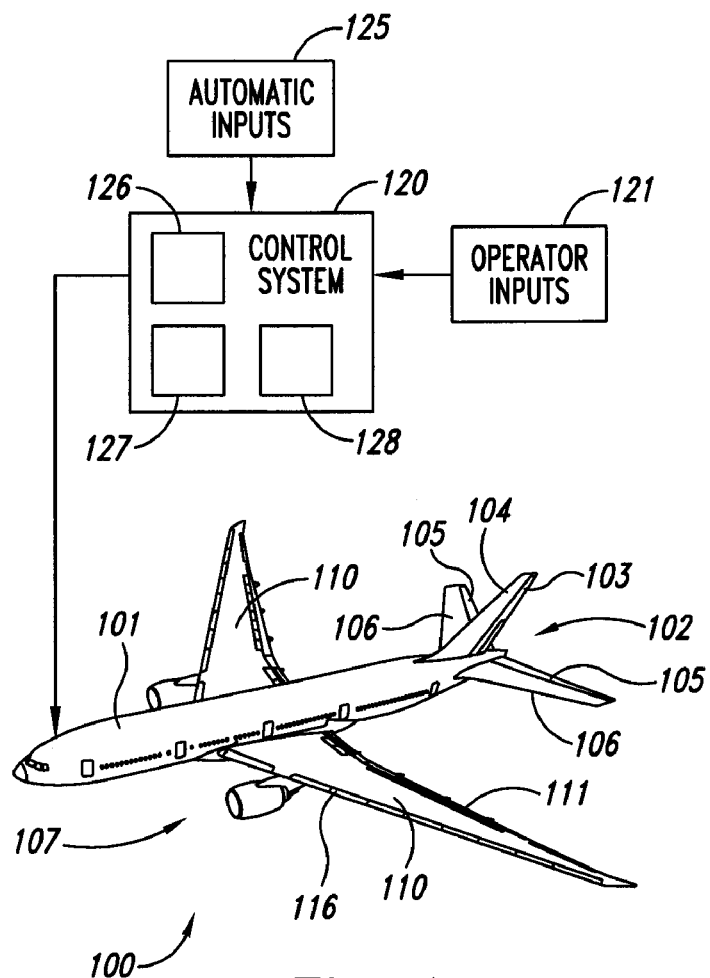
FIG. 1 is a partially schematic, isometric illustration of an aircraft that includes high lift devices configured in accordance with an embodiment of the invention.

FIG. 1 is a partially schematic, isometric illustration of an aircraft 100 having a fuselage 101 carried by wings 110. The aircraft 100 can further include an empennage 102 carrying a rudder 103, a vertical stabilizer 104, horizontal stabilizers 106, and elevators 105. A propulsion system 107 can include one or more engines that are attached to the wings 110 (as shown in FIG. 1), the fuselage 101, and/or the empennage 102.

The wings 110 can include leading edge devices 116 and trailing edge devices 111 that control the camber of the wing during one or more flight segments. The leading edge devices 116 and the trailing edge devices 111 can be coupled to a control system 120 that receives operator inputs 121 and automatic inputs 125 for controlling the operation of the leading edge devices 116 and the trailing edge devices 111. The control system 120 can also control the operation of the propulsion system 107, the elevators 105, and the rudders 103. Accordingly, the control system 120 can include a computer having a processor 126 and a memory 127, and can be configured to read instructions from one or more computer-readable media 128.

Figure 2A:
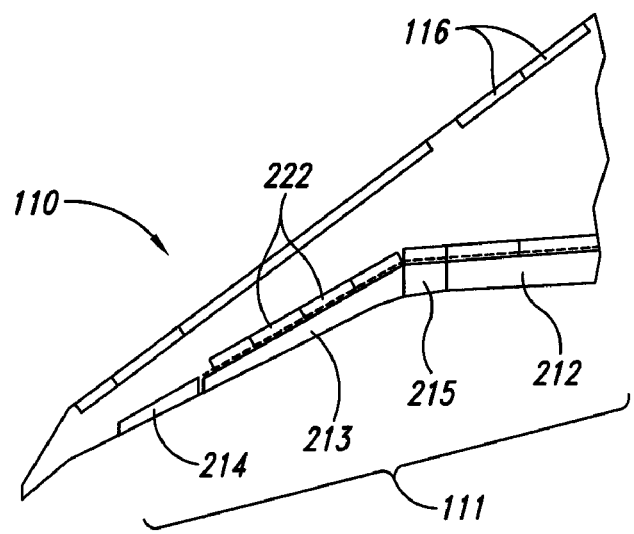
FIG. 2A is a partially schematic, plan view of an aircraft wing having high lift devices configured in accordance with an embodiment of the invention.

FIG. 2A is a partially schematic, plan view of one of the wings 110 described above with reference to FIG. 1. The wing 110 can include multiple trailing edge devices 111, for example, an inboard flap 212, an outboard flap 213, an aileron 214, and a flaperon 215. The aileron 214 can be used to provide roll control to the aircraft during high speed flight, and the flaperon 215 can be used to provide both roll control and high lift during low speed flight (e.g., takeoff and landing). Spoilers 222 can provide for aircraft deceleration and/or lift reduction. The inboard flap 212 and the outboard flap 213 can be operated to provide both high lift (during low speed flight) and variable wing camber (during high speed flight), as described in greater detail below.

Figure 2B:
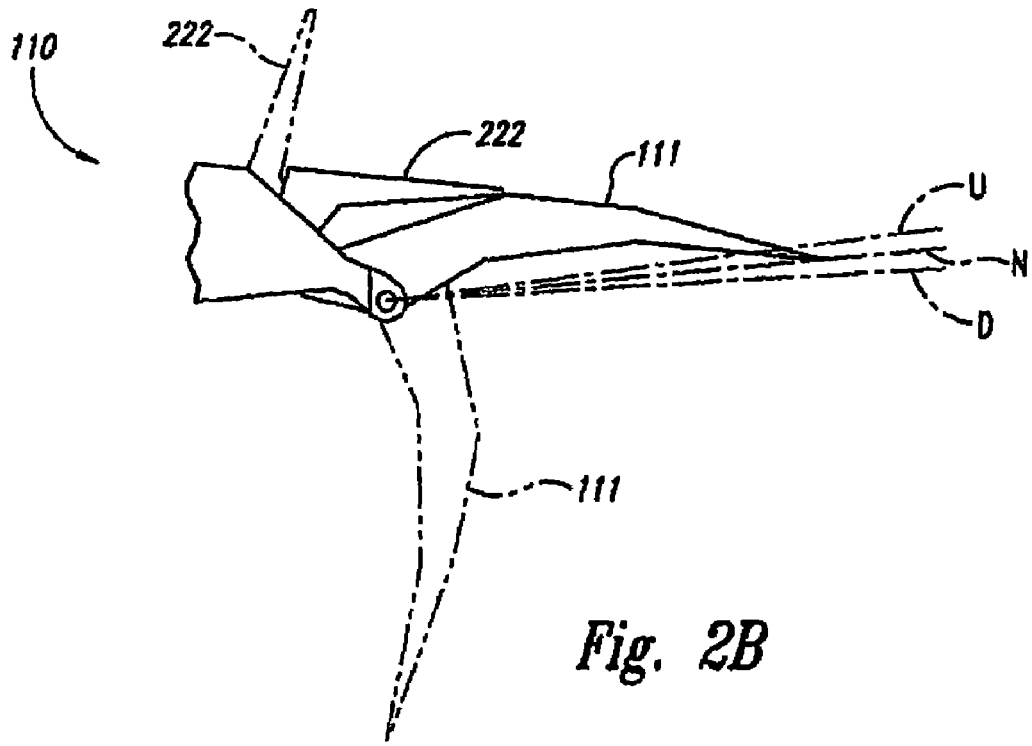
FIG. 2B is a partially schematic, cross-sectional illustration of the wing shown in FIG. 2A.

FIG. 2B is a partially schematic, cross-sectional illustration of a portion of the wing 110 shown in FIG. 2A, including one of the trailing edge devices 111 (e.g., the inboard flap 212 or the outboard flap 213) and the spoiler 222. During deceleration, the spoiler 222 can be deflected upwardly, as indicated in dashed lines in FIG. 2B. During takeoff and landing, the trailing edge device 111 can be deflected downwardly through relatively large angles (depending upon factors that include whether the aircraft is taking off or landing, the length of the airport runway, wind conditions, etc.).

In a particular embodiment of the invention, the same trailing edge devices 111 that provide for high lift during low speed operations can also be deflected by relatively small amounts to tailor the lift distribution across the span of the wing 110. In other words, trailing edge devices 111 having different spanwise locations on the wing 110 can be deflected by different amounts and/or in different directions to adjust the camber of the wing 110 at a plurality of spanwise locations and therefore tailor the lift distribution of the wing 110 to account for conditions that may vary in a spanwise direction. Accordingly, the trailing edge devices 111 can be deflected from a neutral position N to an upwardly deflected position U and/or to a downwardly deflected position D. In particular embodiments, the deflections from the neutral position N can be on the order of a few degrees (e.g., plus or minus two degrees). In other embodiments, these deflections can have other values. In any of these embodiments, the overall arrangement of the trailing edge devices 111 themselves can be the same as, or at least generally similar to, existing arrangements. The capability to operate the trailing edge devices 111 during high speed flight can be provided by additions to and/or replacements of the existing hardware and software used to control the operation of the existing trailing edge devices 111.

Figure 2C:
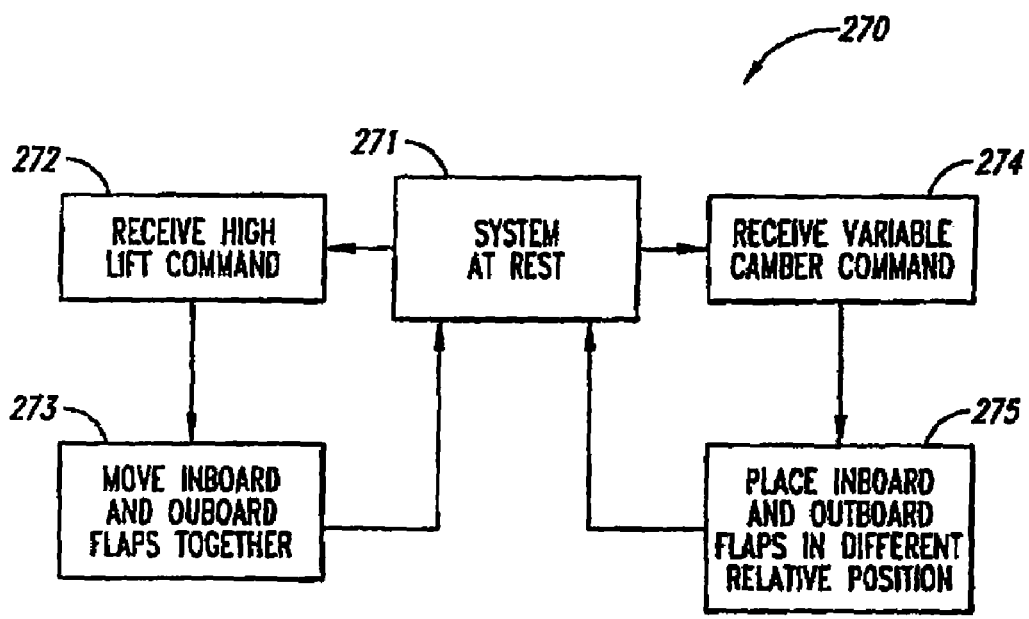
FIG. 2C is a flow chart illustrating a method for moving high lift devices in accordance with an embodiment of the invention.

FIG. 2C is a flow chart illustrating a process 200 for moving high lift devices in accordance with an embodiment of the invention. In process portion 271, the system is at rest. Accordingly, the high lift devices (e.g., inboard and outboard flaps 213) can be prevented from moving by one or more brakes. In process portion 272, the system receives a high lift command, e.g., a command from a pilot to increase the lift of the wing, generally at relatively low flight speeds, including take-off and landing. In process portion 273, the system moves the inboard and outboard flaps together to configure the wing for high lift.

In process portion 274, the system receives a variable camber command, e.g., an automatic or pilot-initiated command to adjust the camber of the wings in such a manner that the camber at inboard and outboard parts of the wing are different. Accordingly, in process portion 275, the system places the inboard and outboard flaps at different relative positions, typically at higher speed conditions, including cruise conditions. Further details of systems for performing these functions are described below with reference to FIGS. 3A-4E.

Figure 3A:
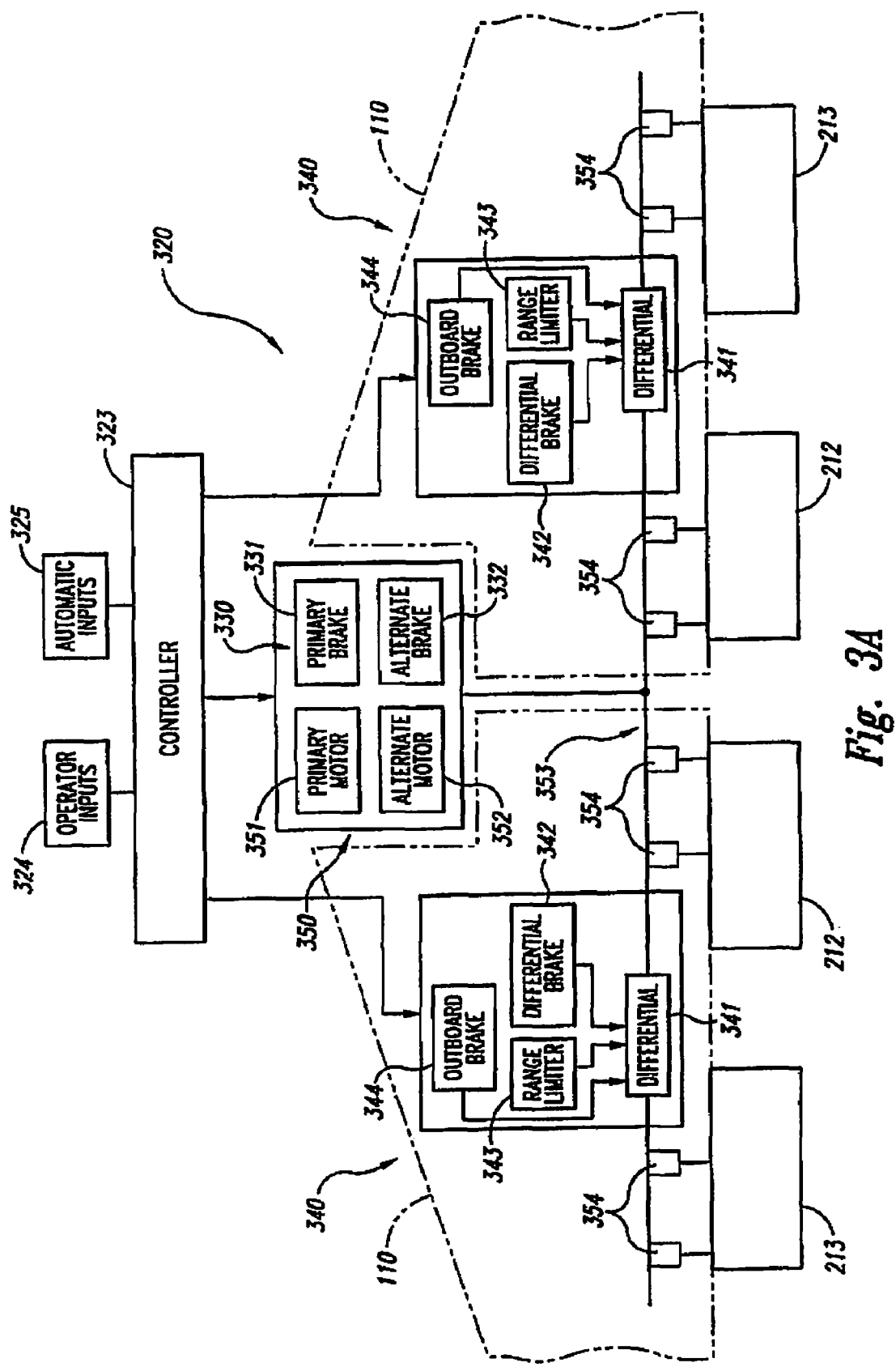
FIGS. 3A-3E illustrate an arrangement for providing differential motion of wing trailing edge devices in accordance with an embodiment of the invention.

FIG. 3A schematically illustrates portions of the wings 110, including first trailing edge devices (e.g., inboard flaps 212) and second trailing edge devices (e.g., outboard flaps 213). A drive system 350 moves the flaps 212, 213 to selected positions, and a control system 320 directs and coordinates the operation of the drive system 350 to provide unitary and differential motion to the inboard flaps 212 and the outboard flaps 213. The differential motion provides the wings 110 with an adjustable, spanwise varying camber. The control system 320 can include a controller 323 that receives operator inputs 324 and automatic inputs 325. In a particular embodiment, the operator inputs 324 can cause the controller 323 to direct the flaps 212, 213 to move in unison, for example, during normal takeoff and landing operations. The automatic inputs 325 can cause the controller 323 to direct differential motion of the inboard flaps 212 and the outboard flaps 213 to tailor the camber of the wings 110, for example, during high speed flight.

The drive system 350 can include a drive link 353 that delivers power to the flaps 212, 213. The drive link 353 can be coupled to both a primary motor 351 and an alternate or backup motor 352. The primary motor 351 can provide power to the flaps 212, 213 during normal operations, and the alternate motor 352 can provide power to the flaps 212, 213 in the event the primary motor 351 is unable to do so. As is also described in greater detail below, the primary motor 351 can provide power to the flaps 212, 213 when the flaps are moved during low speed flight segments, and the alternate motor 352 can provide power to the flaps 212, 213 during high speed flight segments. The drive link 353 can be coupled to a plurality of actuators 354, each of which provides power to the flaps 212, 213. In a particular embodiment, the drive link 353 can include a mechanical drive shaft (e.g., a torque tube) and in other embodiments, the drive link can include other types of links, including hydraulic links and electrical links.

The control system 320 can include one or more control devices that coordinate, direct, and control the manner in which power is provided to the flaps 212, 213, under the direction of the controller 323. In a particular embodiment, the control system 320 can include a central control device 330 that provides power to devices located in both wings 110, and a differential control device 340 located in each of the wings 110. The differential control devices 340, together with the central control device 330, can provide power differentially to the inboard flaps 212 and the outboard flaps 213.

The central control device 330 can include a primary brake 331 that brakes the primary motor 351, and an alternate brake 332 that brakes the alternate motor 352. The differential control devices 340 can each include a differential 341 that receives power from the drive link 353 and distributes the power to the corresponding inboard flap 212, or the outboard flap 213, or both. Accordingly, the differential 341 can include a planetary gear device or other suitable mechanical differential, or an equivalent hydraulic or electrical device, depending on the nature of the drive link 353. When a differential brake 342 is engaged with the differential 341, the differential 341 provides power to both the inboard flap 212 and the outboard flap 213. When an outboard brake 344 is engaged with the differential 341, only the inboard flap 212 moves. When the inboard flap 212 and/or the outboard flap 213 is moved during high speed flight, a range limiter 343 can be engaged with the drive link 353 and/or the differential 341 to prevent unnecessarily high deflections of either of the flaps 212, 213. The range limiter 343 can include a mechanical device, electrical device and/or set of instructions based in a computer-readable medium. The system can also include a stop module (not shown) that limits the angular deflection difference between the inboard flap 212 and the outboard flap 213.

Operation of the control system 320 and the flaps 212, 213 is described below with reference to FIGS. 3B-3E. For purposes of illustration, active devices are generally shown in these Figures outlined in heavy lines. Brakes that are active resist motion of another component of the system, even though in some cases, the brake may resist motion when power is not applied to it, and may release when power is applied to it. Other components (e.g., motors and flaps) are generally moving when active.

Figure 3B:
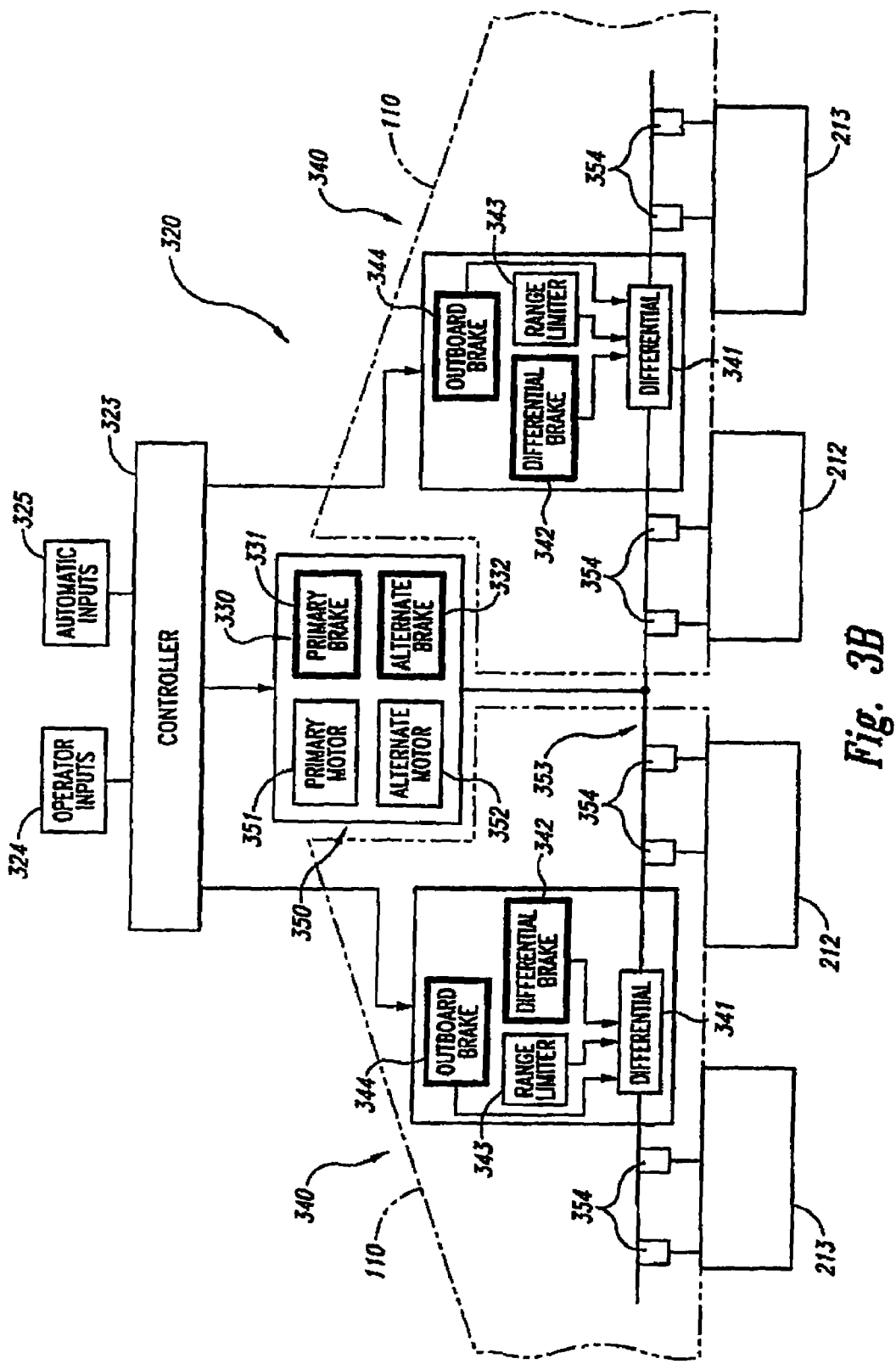

FIG. 3B schematically illustrates the wings 110 when the flaps 212, 213 are stationary. The primary brake 331 is engaged to prevent transmission of power by the primary motor 351, and the alternate brake 332 is engaged to prevent transmission of power by the alternate motor 352. The differential brakes 342 are engaged to prevent differential motion of the inboard flaps 212 relative to the outboard flaps 213, and the outboard brakes 344 are engaged to prevent motion of the outboard flaps 213. Accordingly, none of the flaps 212, 213 move when the system is in this configuration.

Figure 3C:
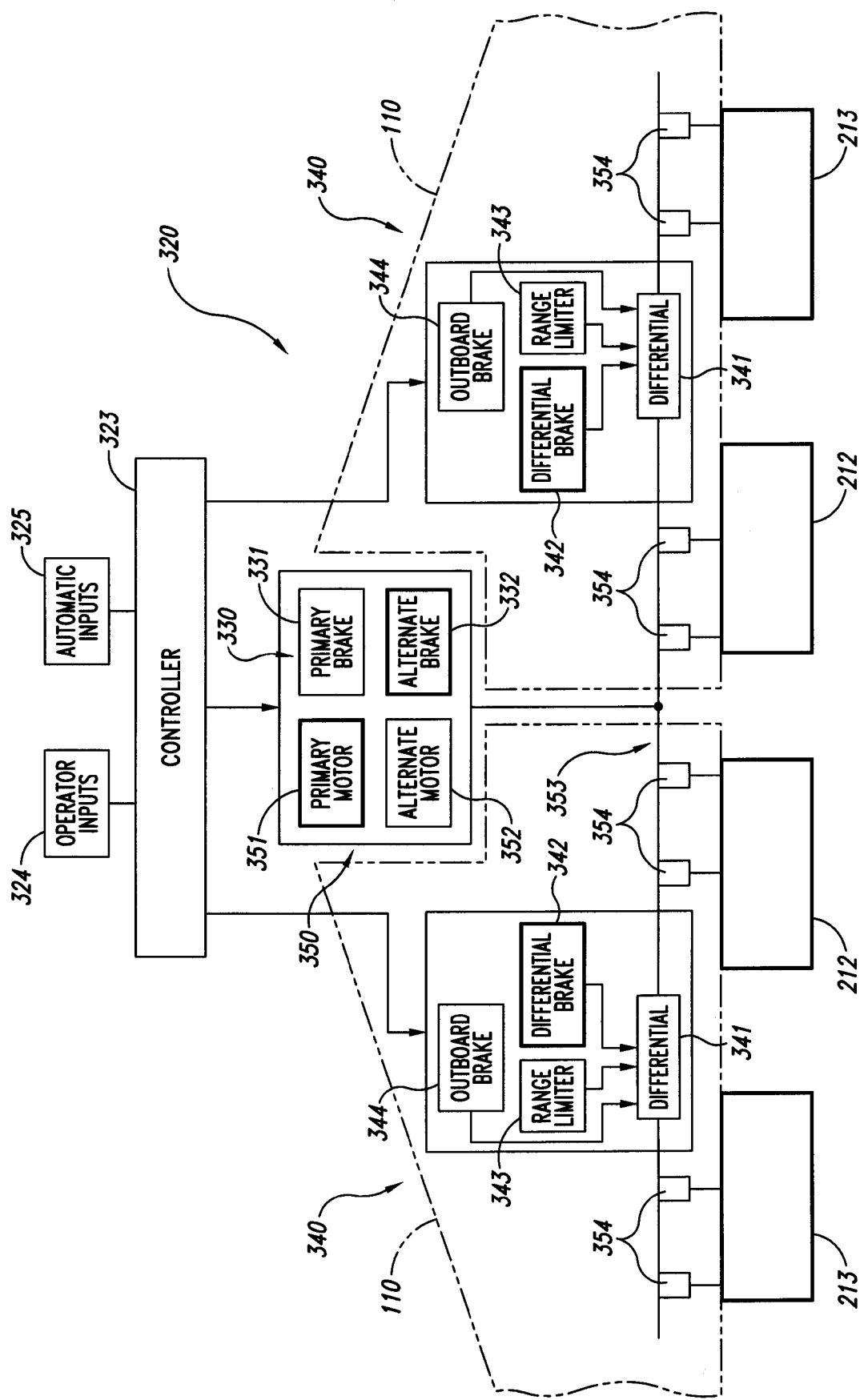

FIG. 3C illustrates a configuration for which the inboard flaps 212 and the outboard flaps 213 move together through relatively large deflections, for example, during takeoff and/or landing. In this configuration, the primary motor 351 can provide power to the drive link 353, and the alternate brake 332 can disable the alternate motor 352, which is inactive. The differential brakes 342 are engaged with the differentials 341 so that power provided by the drive link 353 is provided to actuators 354 associated with both the inboard flaps 212 and the outboard flaps 213. Accordingly, the differentials 341 in this configuration can act as "pass-through" devices that provide power equally to the inboard flaps 212 and the outboard flaps 213.

Figure 3D:
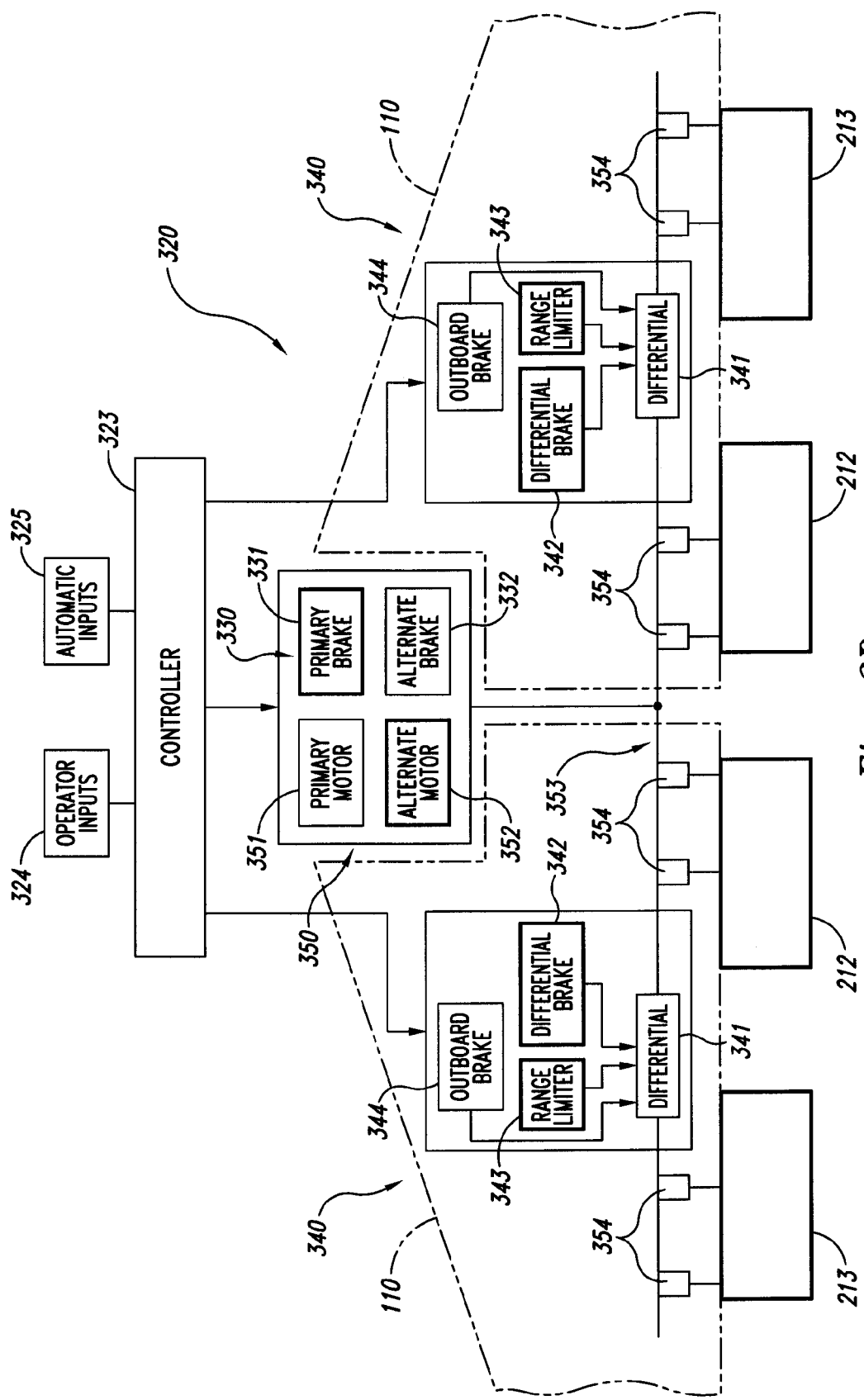

FIG. 3D illustrates the wings 110 and the control system 320 in another configuration for which the inboard flaps 212 and the outboard flaps 213 are moved together during high speed flight segments (e.g., cruise). In one aspect of this embodiment, the primary brake 331 has engaged the primary motor 351 and the alternate brake 332 has been released. Accordingly, the alternate motor 352 provides power to the drive link 353. The differential brakes 342 are engaged so that power provided by the drive link 353 is delivered to both the inboard flaps 212 and the outboard flaps 213. The range limiter 343 is also engaged to prevent large deflections of the inboard flaps 212 and the outboard flaps 213. For example, the motion of the flaps 212, 213 can be limited to plus or minus two degrees in one embodiment, and to other values that depend on aircraft flight speed, structural loading considerations and/or other factors in other embodiments. Both the inboard flaps 212 and the outboard flaps 213 can be moved together until the outboard flaps 213 achieve the desired position.

Figure 3E:
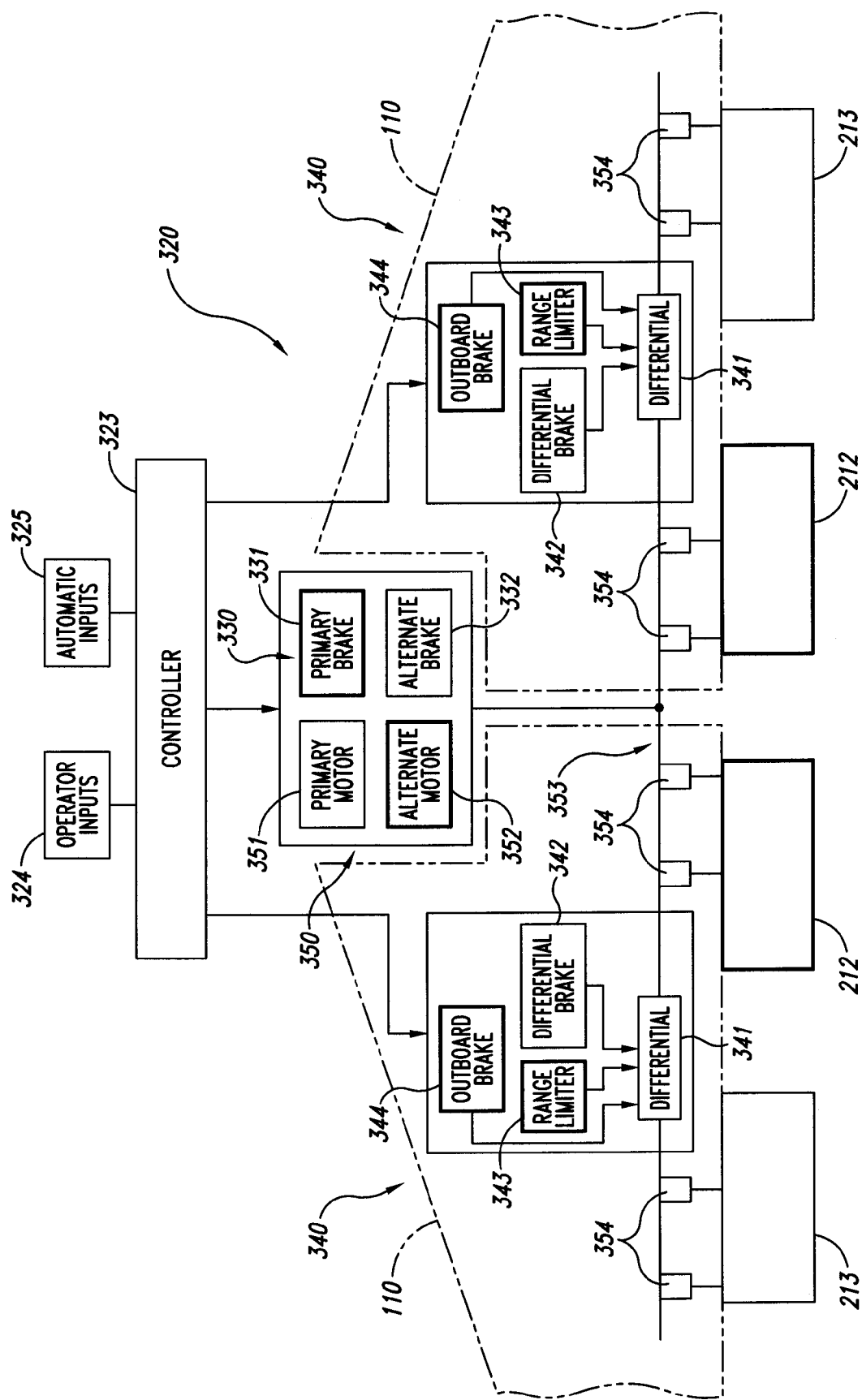

Once the outboard flaps 213 have been moved to their target positions, the inboard flaps 212 can be moved relative to the outboard flaps 213, as shown in FIG. 3E. In this configuration, the primary brake 331 remains engaged with the primary motor 351 so that the alternate motor 352 provides power to the drive link 353. The range limiters 343 also remain engaged to prevent excessive motion of the inboard flap 212. The differential brakes 342 are released and the outboard brakes 344 are applied so that the differentials 341 provide power to the inboard flaps 212 but not the outboard flaps 213. The outboard flaps 213 are effectively decoupled from the drive link 335. Accordingly, the inboard flaps 212 can now be moved to their target positions. As a result, the inboard flaps 212 have a different deflection than the outboard flaps 213. If it is desired to move only the inboard flaps 212, the system can be operated while in the configuration shown in FIG. 3E, without first moving the inboard and outboard flaps together via the configuration shown in FIG. 3D.

One feature of an embodiment of the system described above with reference to FIGS. 3A-3E is that the inboard flaps 212 can be moved relative to the outboard flaps 213 during high speed flight segments. Accordingly, the camber of the wing 110 at a spanwise location aligned with the inboard flaps 212 can be different than the camber of the wing 110 at a spanwise location aligned with the outboard flaps 213. In this manner, the lift and drag characteristics of the wing 110 can be varied in a spanwise direction to account for conditions that can make the "optimal" or nearly optimal camber of the wing 110 at different spanwise locations different. Such conditions can arise, for example, when fuel is used more rapidly from inboard fuel tanks than outboard fuel tanks (or vice versa), which can reduce the need for lift at one section of the wing 110 more rapidly than at another section of the wing 110. In other embodiments, other external factors can create lift requirements that vary in a spanwise manner. Such factors include wind gusts that affect inboard and outboard portions of the wing 110 differently. The degree to which a differential camber is applied to the wing can be directed automatically via the automatic inputs 325

Another feature of an embodiment of the system described above with reference to FIGS. 3A-3E is that the range limiter 343 can prevent large deflections of both the inboard and outboard flaps 212, 213 when the aircraft is at a flight condition for which such motions are not appropriate. In particular, the range limiter 343 can automatically prevent such large deflections during aircraft operations above a given Mach number or indicated air speed. The range limiter 343 can automatically disengage when the aircraft falls below such speeds, to allow for large deflections which are appropriate for aircraft takeoff and landing. Whether or not the range limiter 343 is engaged can be controlled automatically via one of the automatic inputs 325 to the controller 323.

Yet another feature of an embodiment of the system described above with reference to FIGS. 3A-3E is that the alternate motor 352 can provide power to the drive link 353 when the flaps 212, 213 are moved through small deflection angles. In particular embodiments, the alternate motor 352 may not have the same rate capabilities as the primary motor 351 (e.g., it may be slower), and accordingly, its use can be particularly appropriate for moving the flaps 212, 213 by small amounts to optimize or at least improve the performance of the wing 110 during cruise or other relatively long flight segments (e.g., climb-out). A further advantage of this arrangement is that the alternate motor 352 is more likely to be used during a typical flight than it would be in a conventional arrangement, and as a result, the aircraft operator will know during the course of the flight whether or not the alternate motor 352 is available in case the primary motor 351 fails.

FIG. 4A-4E illustrate a controller system 420 configured to direct the motion of the inboard flaps 212 and the outboard flaps 213 in accordance with another embodiment of the invention. Accordingly, the controller system 420 can include a controller 423 coupled to a central control device 430 and two differential control devices 440. A drive system 450 includes a drive link 453 that receives power from a primary motor 451 or an alternate motor 452. A primary brake 431 halts motion of the primary motor 451, and an alternate brake 432 halts motion of the alternate motor 452. Each differential control device 450 can include a differential 441, a differential brake 442 and a range limiter 443, all of which operate in a manner generally similar to that described above with reference to FIG. 3A. Each differential control device 440 can also include a differential motor 455 that is coupled to the differential 441, and an outboard brake 444 that is coupled to an outboard segment of the drive link 453, in manners that differ from the arrangement described above with reference to FIG. 3A. Further details of the controller system 420 and its operation are described below with reference to FIGS. 4B-4E.

Figure 4A:
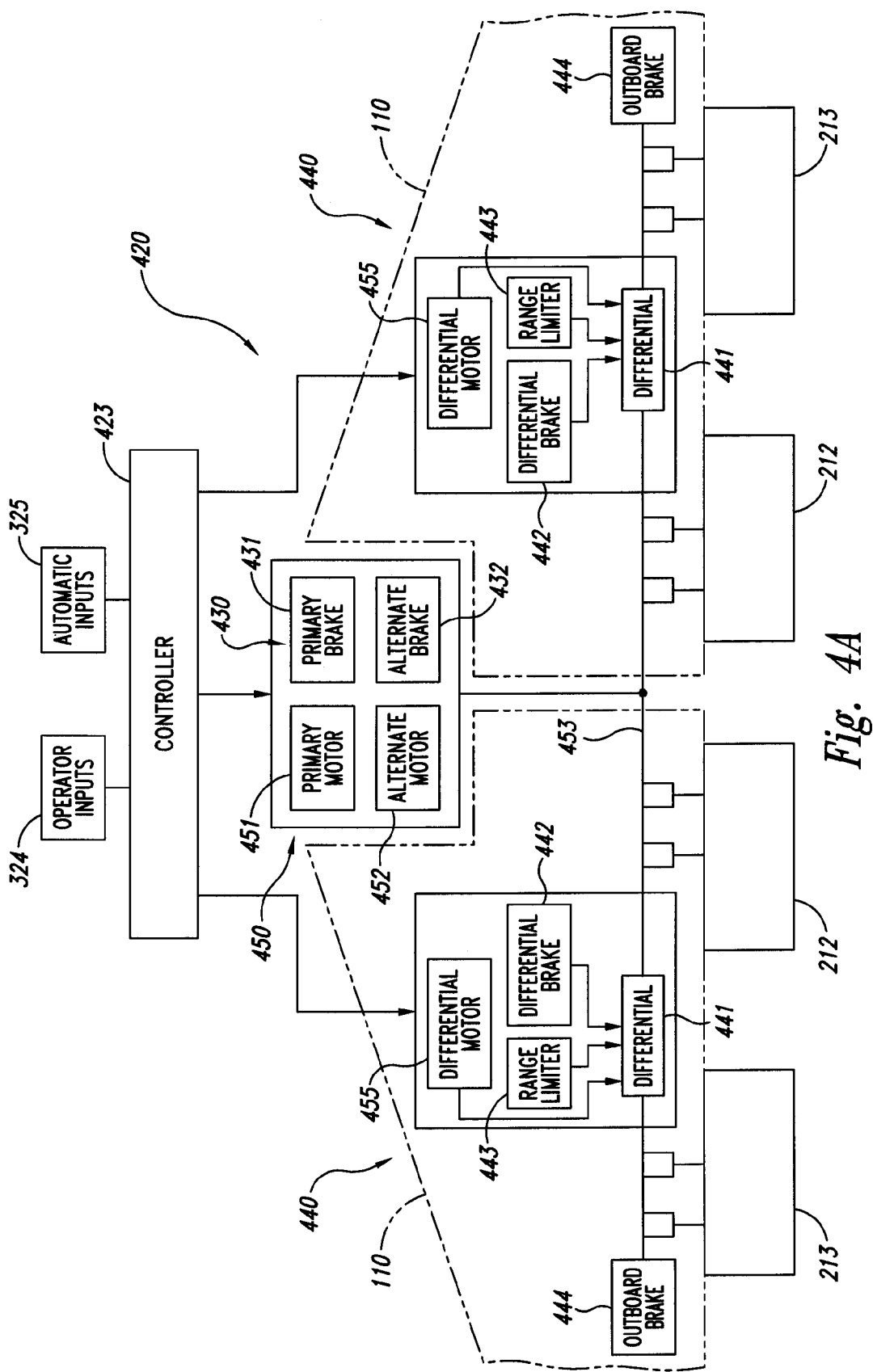
FIGS. 4A-4E illustrate an arrangement for providing differential motion of wing trailing edge devices in accordance with another embodiment of the invention.
Figure 4B:
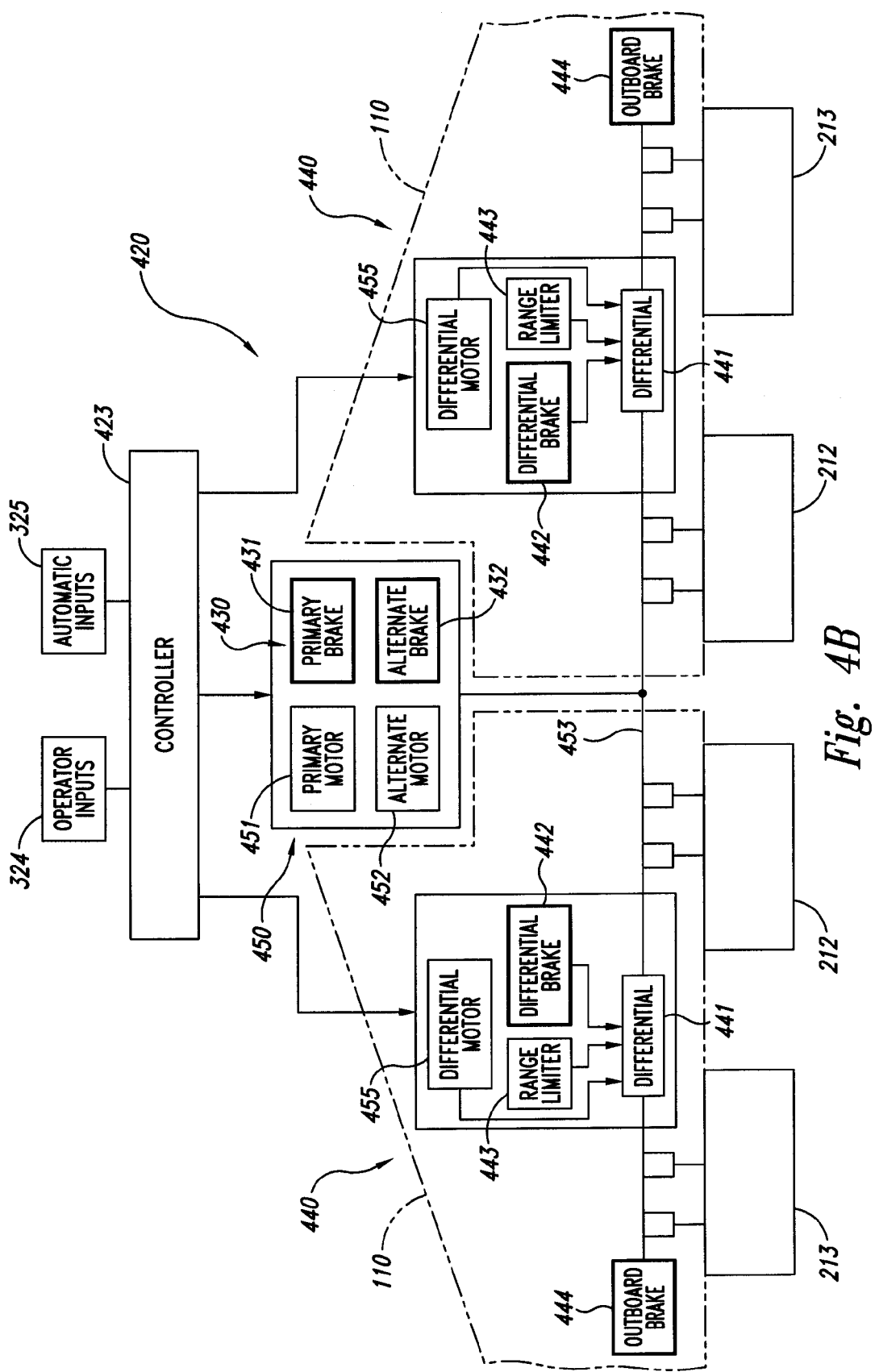

FIG. 4B illustrates the system at rest. The primary brake 431 prevents motion of the primary motor 451 and the alternate brake 432 prevents motion of the alternate motor 452. The differential brakes 442 are engaged to prevent differential power to the inboard flaps 212 relative to the outboard flaps 213, and the outboard brakes 444 prevent motion of the outboard flaps 213.

Figure 4C:
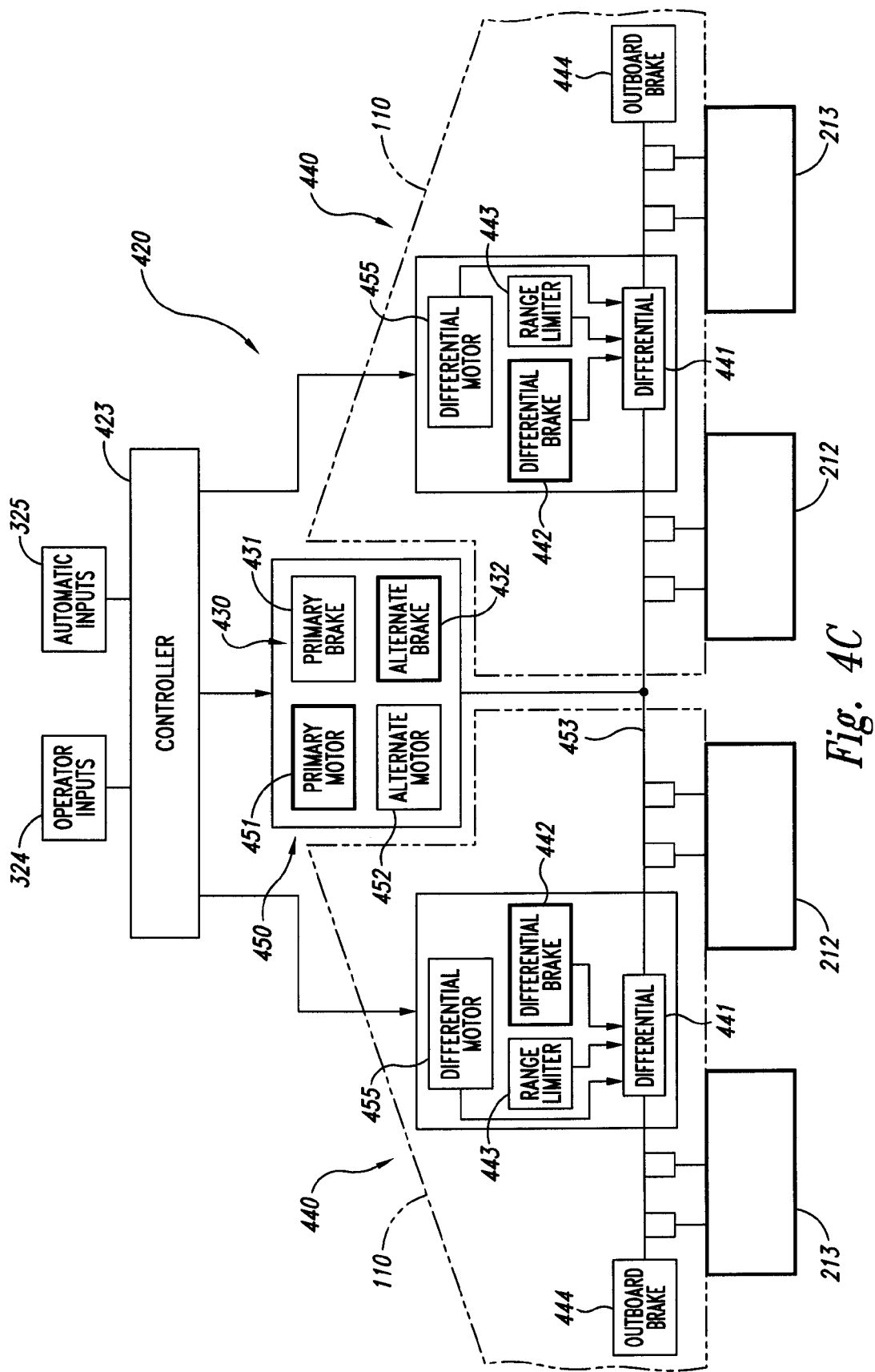

FIG. 4C illustrates the system when it is configured to provide power to the inboard flaps 212 and the outboard flaps 213 during low speed flight conditions. The primary brake 431 is released, allowing the primary motor 451 to provide power to the drive link 453. The differential brake 442 remains engaged so that the differential 441 provides power to both the inboard flaps 212 and the outboard flaps 213. The outboard brakes 444 are released so that the outboard flaps 213 can move.

Figure 4D:
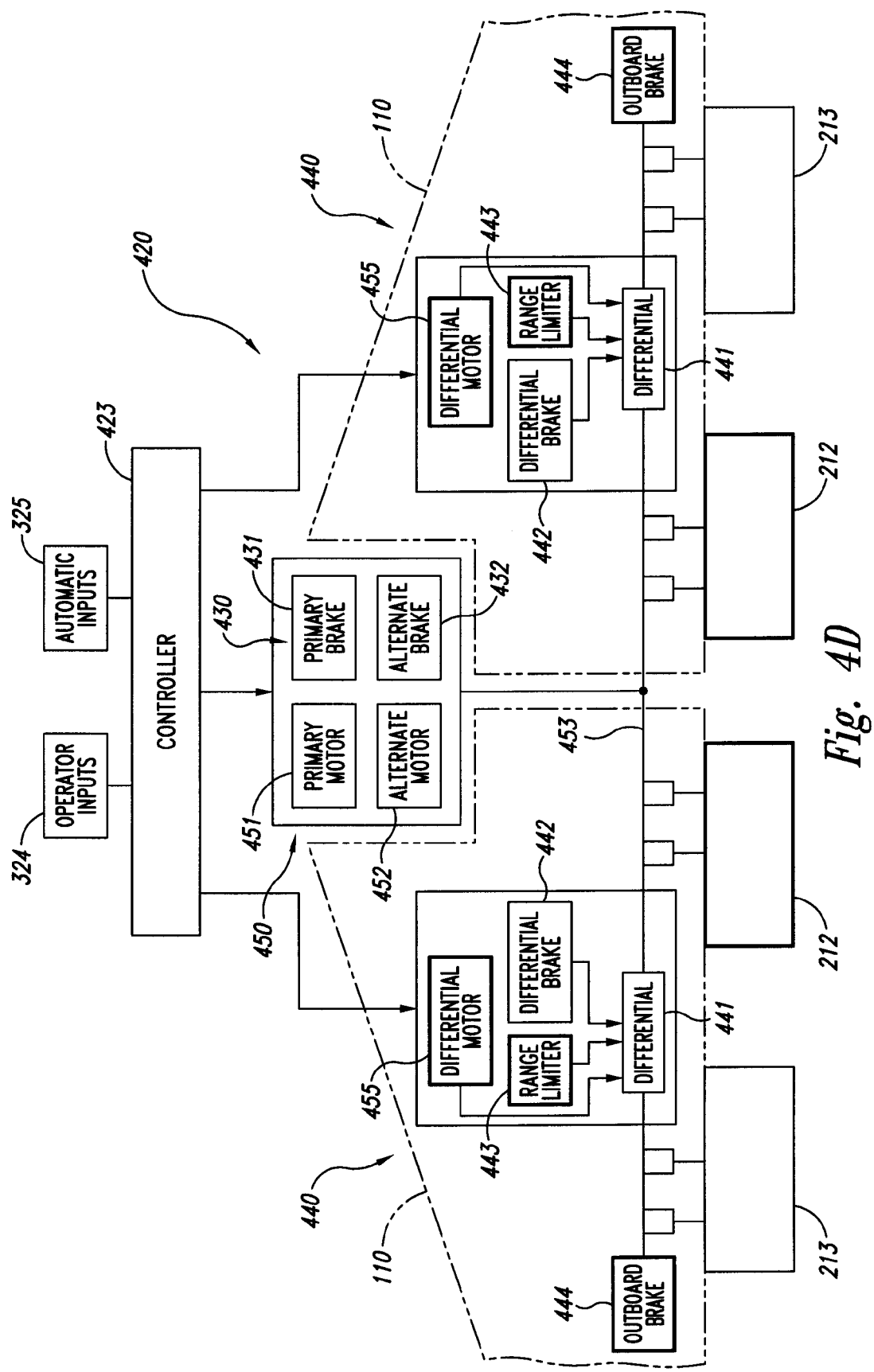

In FIG. 4D, the system is configured to provide differential motion to the inboard flaps 212. Accordingly, both the primary brakes 431 and the alternate brakes 432 are released, and the outboard brakes 444 are engaged. The differential motors 455 are activated to provide motion to only the inboard flaps 212, via the differentials 441. Accordingly, the outboard flaps 213 are effectively decoupled from the drive link 453. The range limiters 443 are also activated to prevent excessive motion of the inboard flaps 212. Accordingly, the inboard flaps 212 can be moved relative to the outboard flaps 213 by relatively small amounts to a desired setting (e.g., during cruise flight segments).

Figure 4E:
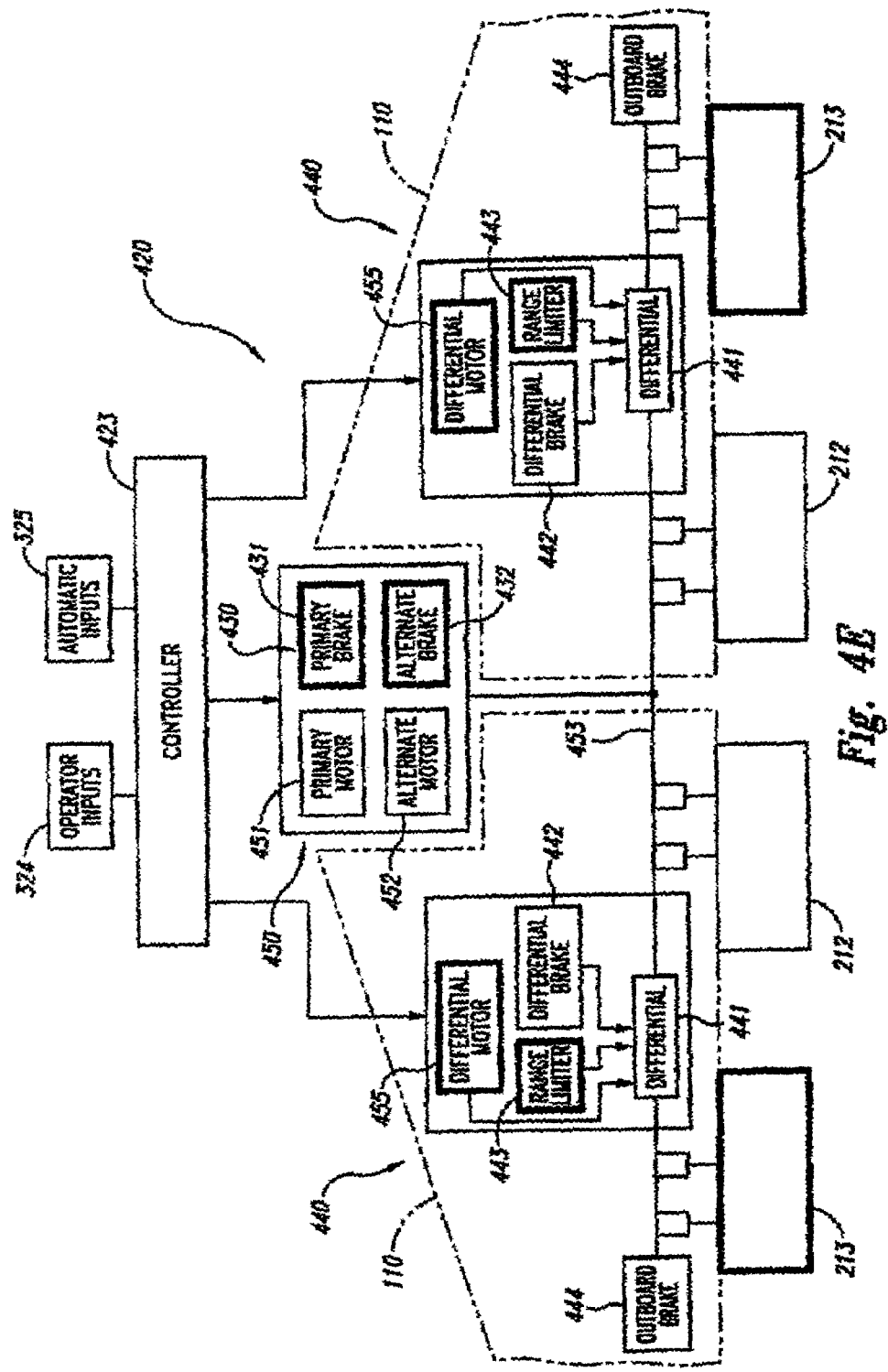

In FIG. 4E, the system is configured to provide differential motion to the outboard flaps 212, independently of the inboard flaps 212. The outboard brakes 444 are released, while the primary brakes 431 and alternate brakes 432 are engaged to prevent motion of the inboard flap 212. The inboard flaps 212 are now decoupled from the drive link 453. Accordingly, when the differential motors 455 are activated, they each drive one of the outboard flaps 213 while the inboard flaps 212 remain in fixed positions.

In other embodiments, the arrangement described above with reference to FIGS. 4A-4E can be used in accordance with other methods. For example, the primary motor 451 can be operated simultaneously with the differential motors 455 to move the inboard and outboard flaps 212, 213 simultaneously, but in different manners. Accordingly, the inboard and outboard flaps 212, 213 can be moved simultaneously but at different speeds, or in different directions.

One feature of an arrangement described above with reference to FIGS. 4A-4E is that the inboard flaps 212 can be moved relative to the outboard flaps 213 (and vice versa) at high aircraft speeds. Accordingly, when it is desired to move only the outboard flaps 213, the inboard flaps 212 need not be moved at the same time and then independently moved back to their desired positions. Conversely, an advantage of the arrangement described above with reference to FIGS. 3A-3E is that it can make use of an existing alternate motor and does not require a separate differential motor. The particular arrangement installed on a given aircraft can be selected based on design criteria and other factors that may be unique to that aircraft. A common advantage of both arrangements, as discussed above, is that they can be used to tailor the spanwise lift distribution of the wing 110 to improve aircraft aerodynamic efficiency.

Figure 5:
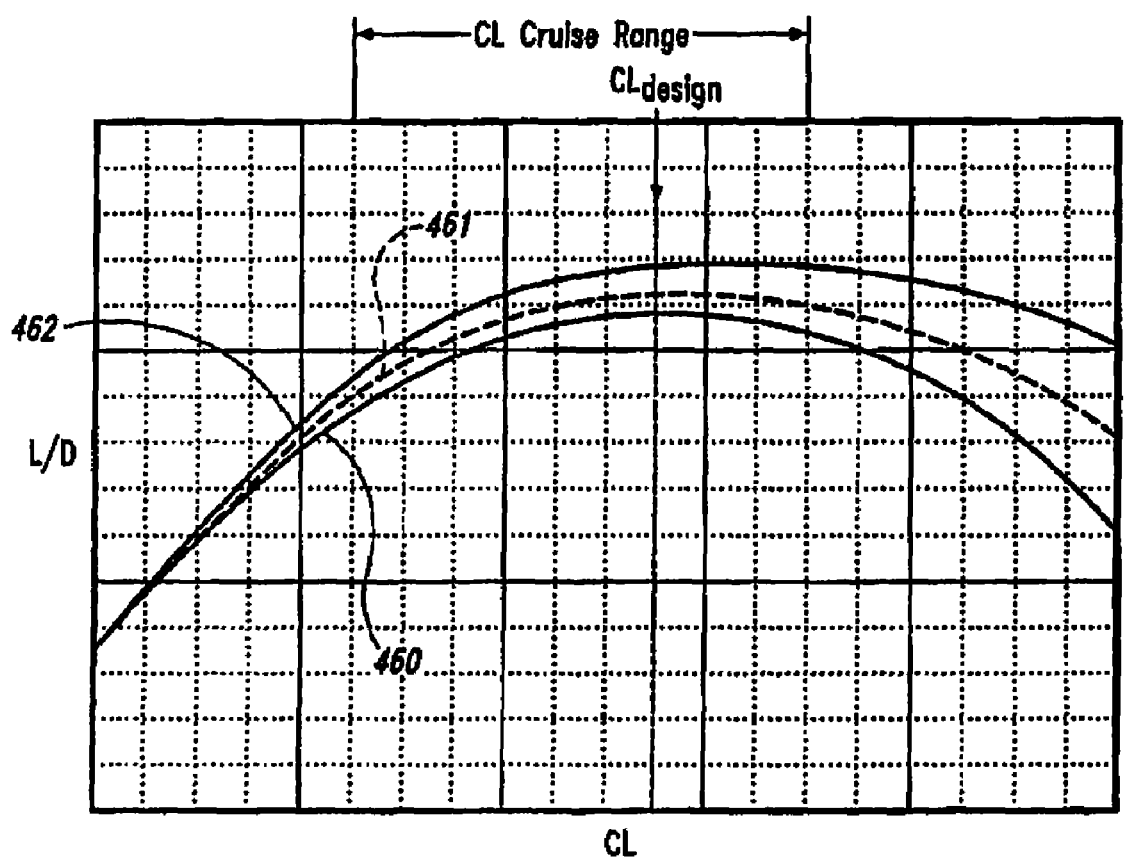
FIG. 5 illustrates a graph depicting predicted increases in aircraft performance resulting from differential trailing edge device motion, in accordance with an embodiment of the invention.

FIG. 5 illustrates a graph depicting lift-to-drag ratios as a function of overall wing lift coefficient (CL), predicted for differential motion of trailing edge devices in accordance with any of the embodiments described above. Line 460 illustrates a baseline lift-to-drag curve for an aircraft that is not capable of manipulating wing camber at high speeds (e.g., cruise speeds). Line 461 illustrates predicted lift-to-drag characteristics for an aircraft wing wherein the trailing edge devices of the wing are actuated in a linked manner to change the camber by the same or a similar amount over the span of the wing. Line 462 illustrates predicted lift-to-drag characteristics when the spanwise camber distribution varies over the span of the wing so that the wing can have a different camber at one spanwise location than at another. As is shown in FIG. 5, adjusting the camber of the wing at high speed can provide for increased wing performance, and differentially adjusting the camber of the wing (e.g., in a spanwise varying manner) can even further increase the wing performance.

From the foregoing, it will be appreciated that specific embodiments of the invention have been described herein for purposes of illustration, but that various modifications may be made without deviating from the spirit and scope of the invention. For example, aspects of the invention described in the context of particular embodiments can be combined or eliminated in other embodiments. In many of the embodiments described above, high lift devices on one side of the aircraft longitudinal centerline are moved in concert with correspondingly-positioned high lift devices on the other side of the aircraft longitudinal centerline. In other embodiments, devices on opposite sides of the aircraft longitudinal centerline can be moved in different manners. In still further embodiments, the differentially movable high lift devices can be coupled to the wing leading edge, in addition to or in lieu of coupling differentially movable high lift devices to the wing trailing edge. While the wings illustrated in the Figures each include two high lift devices that are actuated to provide a variable camber, the wings can include more such high lift devices in other embodiments. Accordingly, the invention is not limited except as by the appended claims.

We claim:

1. An aircraft wing system, comprising:
   a wing having a leading edge and a trailing edge;
   a first deployable lift device having a first spanwise location and being movable relative to the wing from a stowed position to at least one first deployed position;
   a second deployable lift device having a second spanwise location different than the first and being movable relative to the wing from a stowed position to at least one second deployed position;
   a drive system that includes:
      a first motor;
      a first motor brake coupled to the first motor to selectively inhibit the first motor;
      a second motor;
      a second motor brake coupled to the second motor to selectively inhibit the second motor; and
      a drive link that includes a mechanical shaft, wherein the first and second motors are individually coupleable to the mechanical shaft, and wherein the drive link is connected to the first deployable lift device;
   a differential having a single power input, the single power input being connected to the mechanical shaft, the differential further having an output connected to the second deployable lift device;
   a differential brake coupled to the differential;
   a lift device brake coupled to the differential; and
   a control system connected to the drive system, the differential, the differential brake and the lift device brake, the control system being programmed with instructions that, when executed: connect the first and second deployable lift devices to the first motor via the drive link and engage the differential brake to move the first and second deployable lift devices together; and
   disconnect the first and second deployable lift devices from the first motor, connect the first deployable lift device to the second motor via the drive link, and engage the lift device brake to move the first deployable lift device relative to the second deployable lift device.

2. The system of claim 1 wherein the first motor has a first rate capability and the second motor has a second rate capability less than the first rate capability.

3. The system of claim 1, further comprising a range limiter operatively coupled to the first and second deployable lift devices to provide a first range of motion when the control system moves the first and second deployable lift devices together, and provide a second range of motion less than the first range of motion when the control system moves the first deployable lift device relative to the second deployable lift device.

4. The system of claim 1 wherein the first deployable lift device is inboard of the second deployable lift device.

5. The system of claim 1, further comprising a fuselage coupled to the wing.

6. An aircraft wing system, comprising:
   a wing having a leading edge and a trailing edge;
   a first deployable lift device having a first spanwise location and being movable relative to the wing from a stowed position to at least one first deployed position;
   a second deployable lift device having a second spanwise location different than the first and being movable relative to the wing from a stowed position to at least one second deployed position;
   a drive system that includes:
      a first motor;
      a second motor; and
      a drive link, wherein the first and second motors are individually coupleable to the drive link, and wherein the drive link is connected to the first deployable lift device;
   a differential having a single power input, the single power input being connected to the drive link, the differential further having an output connected to the second deployable lift device; and
   a control system connected to the drive system and the differential, the control system being programmed with instructions that, when executed:
   connect the first and second deployable lift devices to the first motor via the drive link and the differential to move the first and second deployable lift devices together by applying a first braking action to the differential; and
   disconnect the first and second deployable lift devices from the first motor, prevent motion of the second deployable lift device at the differential by applying a second braking action to the differential, and connect the first deployable lift device to the second motor via the drive link to move the first deployable lift device relative to the second deployable lift device.

7. The system of claim 6 wherein the first motor has a first rate capability and the second motor has a second rate capability less than the first rate capability.

8. The system of claim 6, further comprising a range limiter operatively coupled to the first and second deployable lift devices to provide a first range of motion when the control system moves the first and second deployable lift devices together, and provide a second range of motion less than the first range of motion when the control system moves the first deployable lift device relative to the second deployable lift device.

9. The system of claim 6 wherein the drive link includes a mechanical shaft connected to the single power input of the differential.

10. A method for operating an aircraft wing, comprising:
activating a control system coupled to an aircraft wing system, the aircraft wing system comprising:
a wing having a leading edge and a trailing edge;
a first deployable lift device having a first spanwise location and being movable relative to the wing from a stowed position to at least one first deployed position;
a second deployable lift device having a second spanwise location different than the first and being movable relative to the wing from a stowed position to at least one second deployed position;
a drive system that includes: a first motor; a second motor; and
a drive link, wherein the first and second motors are individually coupleable to the drive link, and wherein the drive link is connected to the first deployable lift device;
a differential having a single power input, the single power input being connected to the drive link, the differential further having an output connected to the second deployable lift device;
wherein the control system is connected to the drive system and the differential, and the control system is programmed with instructions that, when executed:
rotate the drive link with the first motor;
move the first deployable lift device with the first motor via the drive link, the first motor providing power via the drive link to the single power input of said differential;
place the differential in a first configuration while applying a first braking action to the differential to drive both the first deployable lift device and the second deployable lift device together;
change the configuration of the differential from the first configuration to a second configuration by applying a second braking action to the differential;
rotate the drive link with the second motor and direct power from the second motor via the drive link to the single power input of the differential; and
move the first deployable lift device relative to the second deployable lift device via the second motor while the differential has the second configuration; and
wherein the method further comprises:
executing the instructions.

11. The method of claim 10 wherein rotating the drive link includes rotating a mechanical shaft.

12. The method of claim 10, wherein rotating the drive link with the first motor includes rotating the drive link with the first motor having a first rate capability and wherein rotating the drive link with the second motor includes rotating the drive link with the second motor having a second rate capability less than the first rate capability.

13. The method of claim 10 wherein moving the first and second deployable lift devices together includes moving the first and second deployable lift devices at a first rate during low speed flight operations, and wherein moving the first deployable lift device relative to the second deployable lift device includes moving the first deployable lift device at a second rate less than the first rate during high speed flight operations.

14. The method of claim 10 wherein moving the first deployable lift device relative to the second deployable lift device include changing a spanwise camber distribution of the wing.

15. The method of claim 10, further comprising limiting a range of motion of the first deployable lift device to have first value when moving the first and second deployable lift devices together, and limiting the range of motion of the first deployable lift device to have a second value less than the first value when moving the first deployable lift device relative to the second deployable lift device.

* * * * *